Aug. 26, 1952

J. B. McMAHON ET AL 2,608,371

TARE-SETTING CONTROL MECHANISM FOR FILLING CONTAINERS

Filed Dec. 3, 1949

INVENTORS:
Frederick B. Miller and
Jerome B. McMahon,
BY Dawson, Ooms, Booth and Spangenberg,
ATTORNEYS.

Aug. 26, 1952  J. B. McMAHON ET AL  2,608,371
TARE-SETTING CONTROL MECHANISM FOR FILLING CONTAINERS
Filed Dec. 3, 1949  2 SHEETS—SHEET 2

INVENTORS:
Frederick B. Miller and
Jerome B. McMahon
BY Dawson, Ormo, Brott and Spangenberg
ATTORNEYS.

Patented Aug. 26, 1952

2,608,371

UNITED STATES PATENT OFFICE 2,608,371

TARE-SETTING CONTROL MECHANISM FOR FILLING CONTAINERS

Jerome B. McMahon, Wilmette, Ill., and Frederick B. Miller, Cleveland, Ohio, assignors to Republic Flow Meters Company, Chicago, Ill., a corporation of Illinois Application December 3, 1949, Serial No. 131,014

7 Claims. (Cl. 249—1)

This invention relates to control mechanism for filling apparatus and particularly to means to control the filling of barrels with liquids.

In filling containers such as barrels it is necessary to determine the weight of each individual container and to deduct its weight from the total filled weight to insure a uniform weight of contents in each container. It is also necessary to control the filling apparatus accurately to insure that the filling operation will be stopped at the proper time. The present invention has for its principal object the provision of control mechanism which will accomplish these functions accurately and rapidly and one of whose principal features is the accomplishment of these functions automatically.

Another object of the invention is to provide control mechanism which will automatically shut off a filling apparatus when the desired net weight of material has been supplied. In the preferred construction the weight produces proportional changes in a fluid pressure which can control the filling apparatus directly or which can operate electric switches to control the filling apparatus electrically.

Still another object is to provide control mechanism in which the tare weight of the container is balanced out by fluid pressure mechanism.

The above and other objects and advantages of the invention will be more readily apparent when read in connection with the accompanying drawings, in which—

Figure 1:
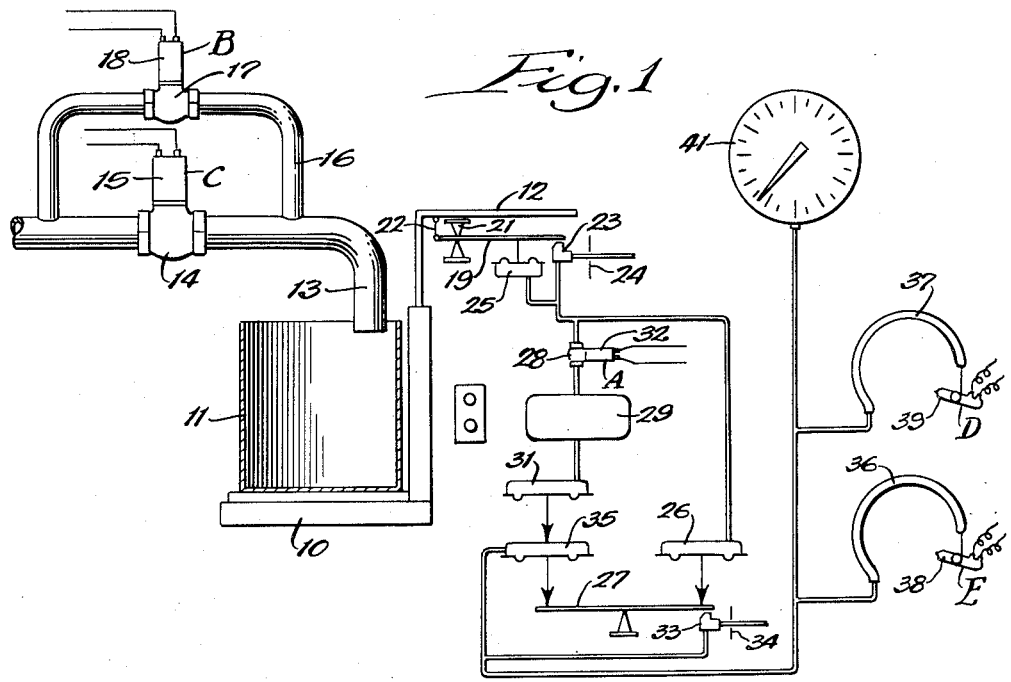
Figure 1 is a diagrammatic view of a barrel filling apparatus embodying the invention.

The apparatus as shown in Figure 1 comprises a scale 10 to receive a barrel 11 to be filled. The scale includes a platform to receive the barrel and the usual scale beam as indicated at 12 which is subjected to a deflecting or unbalancing force proportional to the weight on the scale.

A barrel on the scale may be filled with oil or any other desired liquid through a filling conduit 13 equipped with a main valve 14 operated by a solenoid 15. The valve is constructed so that it is closed when the solenoid is deenergized and opened when the solenoid is energized. A bypass conduit 16 extends around the valve 14 and is provided with a valve 17 controlled by a solenoid 18 in the same manner as the solenoid 15 controls the valve 14. The ratio of the bypass conduit to the main conduit may be adjusted, as desired, but in one preferred construction the capacity of the bypass conduit is approximately one-fourth of the combined capacity when both valves are open.

Figure 2:
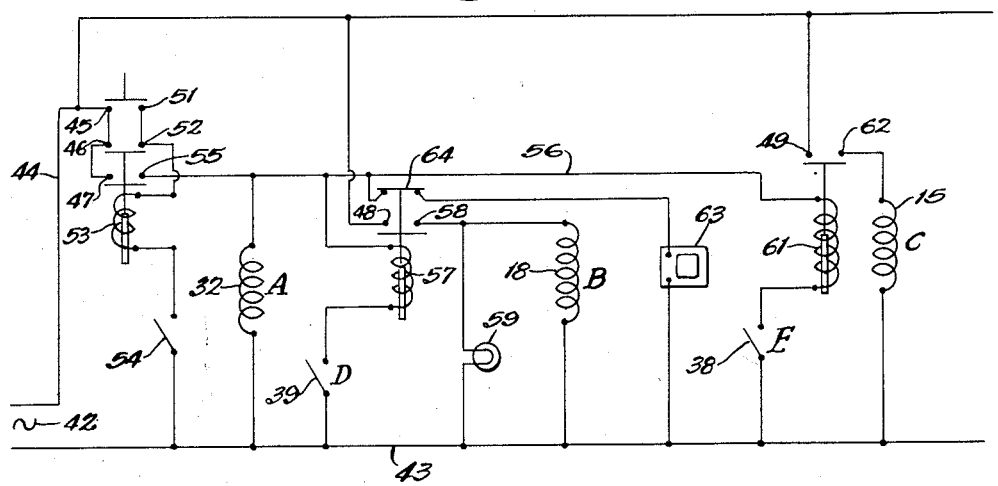
Figure 2 is a wire diagram.

The control apparatus of the present invention, as shown in Figures 1 and 2, is provided to control the opening and closing of the valves 14 and 17 so that the desired weight of liquid will be placed in each barrel. As shown, a balance beam or lever 19 pivoted on a fixed pivot 21 is mounted parallel to the scale beam 12 and is connected thereto through a link 22. The free end of the beam 19 approaches and recedes from an air nozzle 23 supplied with air from a suitable source through a restriction 24 so that the pressure in the nozzle will be proportional to the force urging the beam 19 toward the nozzle. The nozzle is connected to a diaphragm 25 which is connected to the beam 19 to rebalance it. With this construction the pressure acting on the diaphragm 25 as regulated by the nozzle 23 will be directly proportional to the weight on the scale.

The nozzle 23 is connected, as shown, directly to a diaphragm 26 acting on one end of a balance beam 27 and through a valve 28 and volume chamber 29 to a similar diaphragm 31 acting on the opposite end of the beam 27. The diaphragms 26 and 31 are so related in size and so spaced from the pivot point of the beam 27 that they will exert equal and opposite effects on the beam when the valve 28 is open. For example, in the construction shown the two diaphragms may be of equal area and may be equally spaced from the pivot of the beam. The valve 28 is normally open and is controlled by a solenoid 32 to be closed when the solenoid is energized.

The beam 27 approaches and recedes from a nozzle 33 supplied with air through a restriction 34 to produce a second regulated pressure proportional to unbalance on the beam. This regulated pressure is supplied to a diaphragm 35 acting in the same direction as the diaphragm 31 and is also supplied to a pair of pressure elements 36 and 37 controlling switches 38 and 39. A pressure gauge 41 may also be connected to the nozzle 34 to produce an indication of the net weight on the scale as will appear hereinafter.

As indicated in the wiring diagram, Figure 2, the electrical system may be supplied from a suitable source 42 such as the usual city supply circuit. One side of the circuit constitutes a ground line 43 and the opposite side 44 is connected to switch terminals 45, 46, 47, 48, and 49. The terminal 45 comprises one terminal of a manual control switch, the opposite terminal 51 of which is connected to a terminal 52 paired with the terminal 46 and to one side of a relay 53 which is connected through a manually operated stop switch 54 to the ground line 43. The switch terminal 47 is paired with a terminal 55 connected to a line 56, as shown. The solenoid 32 controlling the valve 28 is connected directly between the line 56 and the ground line 43. A relay 57 is connected between line 56 and the ground line through the pressure operated switch 39, and when energized connects the terminal 48 with a terminal 58 which controls a signal lamp 59 and the valve solenoid 18. A second relay 61 is connected through the pressure operated switch 38 between the line 56 and the ground line 43, and when energized, connects the terminal 49 with a terminal 62 to energize the valve solenoid 15. If desired, a signal device such as a buzzer 63 may be connected between the ground line 43 and the line 56 through a switch 64 controlled by the relay 57 to be closed when the relay is deenergized.

In operation of the apparatus with air under pressure supplied to the nozzles 23 and 33 and with the manual stop switch 54 closed and the manual circuit open at the switch contacts 45, 51 an empty barrel may be placed on the scale. The weight of the barrel will produce a force on the beam 19 variably to restrict the nozzle 23 so that it will produce a rebalancing pressure proportional to the barrel weight. This pressure will be transmitted to both of the diaphragms 26 and 31, and since they act equally on the beam 27 there will be no effect on the pressure at the nozzle 33. This operation automatically determines the tare weight of the barrel and leaves the apparatus in a condition to fill the barrel with the desired net weight of liquid.

To initiate the filling operation the manual switch is closed temporarily to close the circuit at the contacts 45, 51 thereby to energize the relay 53. This closes a circuit between the contacts 46 and 52 constituting a holding circuit to hold the relay energized until the switch 54 is opened. It also closes a circuit between the contacts 47 and 55 to energize the valve solenoid 32 to close the valve 28 and to energize the relays 57 and 61 through the normally closed switches 38 and 39. The relay 57 interrupts the circuit to the buzzer 63 and energizes the valve solenoid 18 to open the bypass valve 17 and at the same time energize the lamp 59 to indicate that a filling operation is in progress. The relay 61 closes the circuit between contacts 49 and 62 to energize the valve solenoid 15 to open the main valve 14. At this time liquid will start flowing from the filling conduit 13 into the barrel on the scale.

As the filling operation progresses, the beam 19 will be urged toward the nozzle 23 with a greater force to increase the pressure back of the nozzle. This pressure will be transmitted to the diaphragm 26 but cannot be transmitted to the diaphragm 31 because the valve 28 is closed. The initial pressure corresponding to the tare weight of the container will be trapped in the pressure chamber 29 by closing of the valve 28 so that the diaphragm 31 will always exert on the balance beam 27 a force proportional to the tare weight opposing the force exerted by the diaphragm 26 which is proportional to the gross weight. The diaphragm 26 will, therefore, unbalance the beam 27 and urge it toward the nozzle 33 to produce a pressure therein corresponding to the unbalance. It will be noted that this pressure is directly proportional to the net weight of the contents in the barrel due to subtraction of the tare weight by the diaphragm 31. The pressure produced at the nozzle 33 is transmitted to the diaphragm 35 to rebalance the beam 27 and is also transmitted to the gauge 41 to indicate the net weight of the liquid in the barrel. At the same time this pressure acts on the elements 36 and 37 which may be set to open the switches 38 and 39 respectively at any desired values.

The pressure element 36 is set to operate at a lower value than the element 37 so that the switch 38 will be opened when the container or barrel is nearly full. When the pressure produced at the nozzle 33 indicates that the barrel is nearly full, the switch 38 will be opened to deenergize the relay 61 which will deenergize the valve solenoid 15 and permit the main valve 14 to close. The bypass valve 17 will remain open so that the filling rate is reduced. This feature is desirable to prevent overfilling in cases where a rapid filling is desired but is not essential in all cases.

When the barrel reaches the desired full weight the pressure produced at the nozzle 33 will be sufficient to operate the pressure element 37 and open the switch 39. This will deenergize the relay 57 interrupting the circuit to the valve solenoid 18 and the signal lamp 59. At this time the bypass valve 17 will close and the signal lamp will be extinguished to indicate that the filling operation is completed. At the same time the circuit to the buzzer 63 will be completed to indicate to the operator that the barrel on the scale is filled.

When the operator removes the filled barrel from the scale, he opens the stop switch 54 which deenergizes the relay 53 and returns the circuit to its starting condition. Under this condition the buzzer is deenergized and the valve 28 is again opened so that the apparatus is in condition for the filling of a second barrel.

Figure 3:
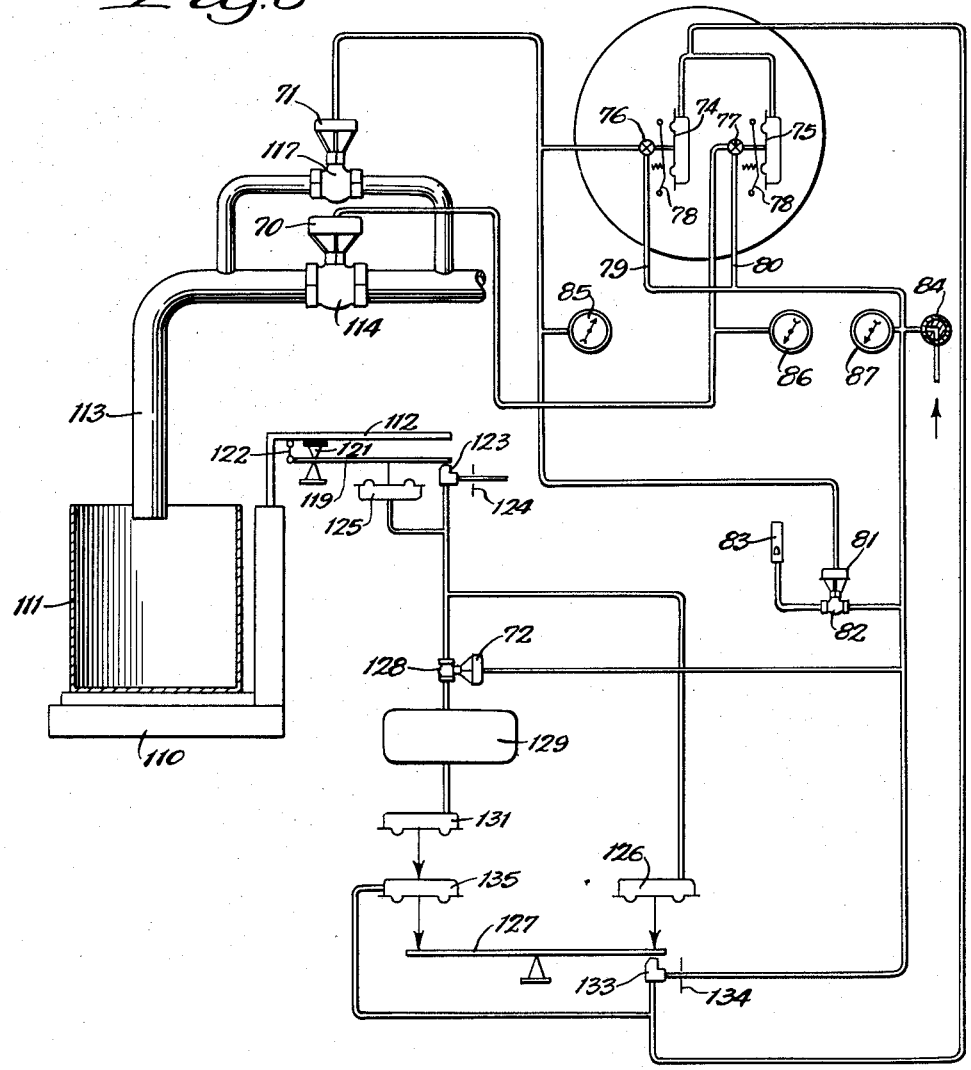
Figure 3 is a view similar to Figure 1 of an apparatus operated entirely by fluid pressure.

Figure 3 illustrates an alternative construction which is operated entirely by fluid pressure without the use of any electrical apparatus. Parts in this apparatus corresponding to identical parts in Figure 1 are indicated by the same reference numerals plus 100. As shown in this apparatus the value 114 is normally closed and is opened by a pressure responsive diaphragm or similar pressure responsive element 70. The valve 117 is similarly normally closed and is opened by a pressure responsive element 71. The valve 128 which is normally open is closed when pressure is applied to a pressure responsive actuating element 72.

The nozzle 133 is connected in parallel to a pair of pressure responsive actuators 74 and 75 set to operate through way valves 76 and 77 at different pressures corresponding to the container being nearly full and filled to the desired point. As shown, each valve actuator comprises a diaphragm acting on its corresponding valve through a spring toggle linkage 78 to produce a snap action. The valves 76 and 77 are normally open when in the positions shown to connect motors 70 and 71 to supply lines 79 and 80 and are closed to vent motors 70 and 71 to atmosphere when the corresponding diaphragms are subjected to the pressure for which the respective valves are set. Preferably, the valve 76 is also connected to a pressure actuator 81 to close a valve 82 controlling the supply of air to a signal device such as a whistle 83. The valve 82 and the three way valves 76 and 77 are connected to a pressure supply controlled by a manually operated valve 84 and which is also connected to the valve actuator 72. Gages 85, 86, and 87 may be provided to indicate the pressures beyond valves 76, 77 and 84.

In the normal condition the valve 84 is closed so that the valve 128 is open, the valve 82 is open and no pressure is supplied to nozzle 133. With the system in this condition the empty barrel is placed on the scale and its tare weight is balanced by the diaphragms 126 and 131 in the same manner as in Figures 1 and 2. When a tare weight balance has been reached the valve 84 is opened to supply air to the actuator 72 and close the valve 128. Opening of the valve 84 will also supply air to the nozzle 133 and through the valves 76 and 77 to the valve actuators 70 and 71 to open the valves 114 and 117. At this time oil will be supplied to the barrel and through the diaphragm 126 will increase the pressure behind the nozzle 133 in proportion to the net weight of liquid in the barrel.

When the barrel is nearly filled, the pressure will rise to a sufficient value to close the valve 77 through its diaphragm 75 thereby reducing the supply of liquid to the barrel. When the barrel is completely filled, the pressure produced at the nozzle 133 will be sufficient to close the valve 76 thereby closing the bypass valve 117 and venting the pressure on motor 81 to open the signal valve 82. This will start the whistle, signaling to the operator that the barrel on the scale is filled. At this time the manual control valve 84 may be turned 90° counterclockwise from the position shown to vent the actuator 72 and to cut-off the air supply from the nozzle 133. The system is thus returned to a condition ready to receive the next barrel to be filled so that the operation can be repeated, if desired.

While two embodiments of the invention have been shown and described in detail herein, it will be understood that they are illustrative only and are not to be taken as a definition of the scope of the invention, reference being had for this purpose to the appended claims.

What is claimed is:

1. Control mechanism for filling apparatus including a scale comprising, a device adapted to be connected to the scale to produce a first force proportional to the weight on the scale, a balance mechanism, a pair of force responsive units acting oppositely on the balance mechanism and connected to said device to be responsive to the first force, control means in the connection between the device and one of said units to interrupt the connection of said one of said units to the device, a second device responsive to unbalancing force exerted on the balance mechanism by the other unit to produce a second force, and means responsive to the second force to control a filling apparatus to terminate a filling operation when the second force reaches a predetermined value.

2. Control mechanism for filling apparatus including a scale comprising, a device adapted to be connected to the scale to produce a first force proportional to the weight on the scale, a balance mechanism, a pair of force responsive units acting oppositely on the balance mechanism and connected to said device to be responsive to the first force, means simultaneously to interrupt the connection of one of said units to said device and to start a filling apparatus, a second device responsive to unbalancing force exerted on the balance mechanism by the other unit to produce a second force, and means to stop the filling apparatus when the second force reaches a predetermined value.

3. Control mechanism for filling apparatus including a scale comprising a first device adapted to be connected to the scale to produce a first fluid pressure, a balance mechanism, a pair of pressure responsive units responsive to the first fluid pressure to urge the balance mechanism in opposite directions, control means to cut off the supply of pressure to one of said units and to start a filling apparatus, a second device connected to the balance mechanism to produce a second fluid pressure proportional to the unbalancing force exerted by the other of said units, and means responsive to the second fluid pressure to stop the filling apparatus.

4. Control mechanism for a filling apparatus including a scale comprising a first device adapted to be connected to the scale to produce a first fluid pressure, a balance mechanism, a pair of pressure responsive units responsive to the first fluid pressure to urge the balance mechanism in opposite directions, electric control means including electrically operated control devices to cut off the supply of pressure to one of said units and to start a filling apparatus, a control switch simultaneously to energize said control devices, and means responsive to the force exerted on the balance mechanism by the other of said units to deenergize said control devices.

5. Control mechanism for a filling apparatus including a scale comprising a first device adapted to be connected to the scale to produce a first fluid pressure, a balance mechanism, a pair of pressure responsive units responsive to the first fluid pressure to urge the balance mechanism in opposite directions, electric control means including electrically operated control devices to cut off the supply of pressure to one of said units and to start a filling apparatus, a control switch simultaneously to energize said control devices, a second device connected to the balance mechanism to produce a second fluid pressure proportional to the unbalancing force exerted by the other of said units, and switch means responsive to the second force to deenergize said control devices.

6. Control mechanism for a filling apparatus including a scale comprising a first device adapted to be connected to the scale to produce a first fluid pressure, a balance mechanism, a pair of pressure responsive units responsive to the first fluid pressure to urge the balance mechanism in opposite directions, pressure operated means to cut off the supply of the first fluid pressure to one of said units and to start a filling apparatus, control means simultaneously to supply actuating fluid to said pressure operated means, and means responsive to the force exerted on the balance mechanism by the other of said units to cut off the supply of actuating fluid to the pressure operated means for starting the filling apparatus.

7. Control mechanism for a filling apparatus including a scale comprising a first device adapted to be connected to the scale to produce a first fluid pressure, a balance mechanism, a pair of pressure responsive units responsive to the first fluid pressure to urge the balance mechanism in opposite directions, pressure operated means to cut off the supply of the first fluid pressure to one of said units and to start a filling apparatus, control means simultaneously to supply actuating fluid to said pressure operated means, a second device responsive to the unbalancing force exerted on the balance mechanism by the other of said units to produce a second fluid pressure, and means responsive to the second fluid pressure to cut off the supply of actuating fluid to the pressure operated means for starting the filling apparatus.

JEROME B. McMAHON.
FREDERICK B. MILLER.

REFERENCES CITED

The following references are of record in the file of this patent:

UNITED STATES PATENTS

| Number | Name | Date |
| --- | --- | --- |
| 1,978,558 | Von Pritzelwitz | Oct. 30, 1934 |
| 1,980,731 | Michener | Nov. 13, 1934 |
| 2,264,562 | Bryant | Dec. 2, 1941 |
| 2,410,139 | Williams | Oct. 29, 1946 |